United States Patent
Sanders et al.

(10) Patent No.: US 7,395,401 B2
(45) Date of Patent: Jul. 1, 2008

(54) SYSTEM AND METHODS FOR ACCESSING SOLID-STATE MEMORY DEVICES

(75) Inventors: Richard Sanders, Hutto, TX (US); Josef Zeevi, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 280 days.

(21) Appl. No.: 11/241,299

(22) Filed: Sep. 30, 2005

(65) Prior Publication Data

US 2007/0079080 A1 Apr. 5, 2007

(51) Int. Cl.
*G06F 12/00* (2006.01)
(52) U.S. Cl. ...................................... 711/170
(58) Field of Classification Search ................ 711/170, 711/154

See application file for complete search history.

(56) References Cited

U.S. PATENT DOCUMENTS

| | | | |
|---|---|---|---|
| 5,668,974 A * | 9/1997 | Grassi et al. ................ 711/157 |
| 6,760,772 B2 | 7/2004 | Zou et al. | |
| 6,859,841 B2 | 2/2005 | Narad et al. | |
| 7,152,139 B1 * | 12/2006 | Barrett ........................ 711/103 |
| 2003/0046510 A1 | 3/2003 | North | |
| 2004/0024941 A1 * | 2/2004 | Olarig et al. ................ 710/302 |
| 2004/0199652 A1 | 10/2004 | Zou et al. | |
| 2005/0018480 A1 | 1/2005 | Choi et al. | |

FOREIGN PATENT DOCUMENTS

| | | |
|---|---|---|
| EP | 1 501 100 A2 | 1/2005 |
| WO | WO 2005/043862 A1 | 5/2005 |
| WO | WO 2005/057881 A1 | 6/2005 |

* cited by examiner

*Primary Examiner*—Hiep T Nguyen
(74) *Attorney, Agent, or Firm*—Toler Law Group, Intellectual Properties

(57) ABSTRACT

The disclosure is directed to a method of determining memory parameters of a memory device. The method includes determining a communication protocol associated with the memory device, determining a page size of the memory device by using the communication protocol to communicate a page of data, determining a block size of the memory device by using the communication protocol to erase a block of the memory device, and determining a capacity of the memory device by using the communication protocol to determine a number of significant address bits.

27 Claims, 3 Drawing Sheets

00010000 — 602
00100000 — 604
01000000 — 606
10000000 — 608

SYSTEM AND METHODS FOR ACCESSING SOLID-STATE MEMORY DEVICES

FIELD OF THE DISCLOSURE

This disclosure, in general, is directed to systems and methods for accessing solid-state memory devices.

BACKGROUND

Increasingly, consumers are demanding portable electronic devices, such as personal digital assistants (PDA), MP3 players, portable storage systems, advanced wireless telephones, cameras, and other handheld devices. Traditional non-volatile storage mediums, such as hard drives, floppy drives and other storage devices, are generally unsuitable for portable devices. These typical devices generally have moving parts and, as such, are subject to mechanical failure. In addition, such devices are bulky and consume a large amount of energy. As a result, developers are turning to solid-state non-volatile memory devices, such as electrically erasable programmable read-only memory (EEPROM) and flash memory, for use in portable products.

To maintain compatibility with solid-state memory devices manufactured by various manufacturers using various device specifications and standards, electronic devices that access or include solid-state memory devices typically include a table of device parameters associated with each of the solid-state memory devices with which the electronic device is designed to be compatible. Given the large number of solid-state memory devices and device specifications for solid-state memory devices, such tables of device specifications may be large and occupy a considerable amount of memory on the electronic device. Moreover, these electronic devices may not be compatible with new memory devices manufactured using new device specifications and revised access parameters.

As such, an improved system and method for accessing solid-state memory devices would be desirable.

DESCRIPTION OF THE DRAWINGS

Figure 1:
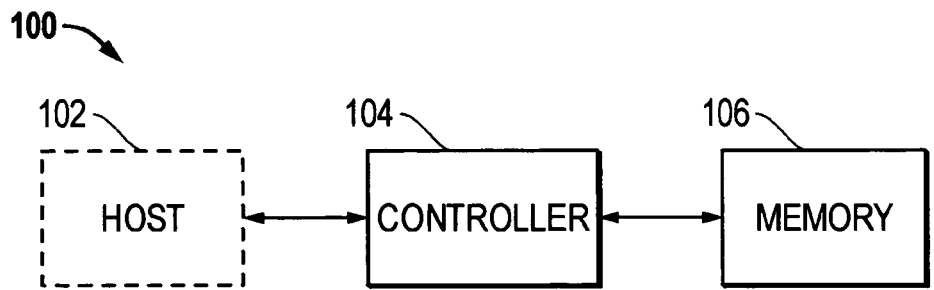
FIGS. 1 and 2 include block diagram illustrations of components of exemplary embodiments of an electronic device.

In a particular embodiment, the disclosure is directed to an electronic device including a controller or a processing system having an interface to a memory device. The controller or processing system includes a device driver and a register or storage location for memory device parameters. Memory device parameters are useful for accessing the memory device and typically include a page size, a block size, and an addressable memory space. In an exemplary embodiment, the device driver is configured to determine a command set or communication protocol useful in communicating with the memory device and to determine the device parameters, including a page size, a block size, and an addressable memory space using the command set to communicate with the memory device. In particular embodiments, the electronic device includes a thumb drive, an MP3 player, a cellular telephone, a personal digital assistant (PDA), a digital camera, or another portable electronic device.

In another particular embodiment, the disclosure is directed to a method of determining memory parameters of a memory device. The method includes determining a communication protocol associated with the memory device, determining a page size of the memory device by using the communication protocol to communicate a page of data, determining a block size of the memory device by using the communication protocol to erase a block of the memory device, and determining a capacity of the memory device by using the communication protocol to determine a number of significant address bits.

In another exemplary embodiment, the disclosure is directed to a method of performing data storage. The method includes selecting a first page size and writing test data to a storage device to a page location. The test data has the first page size. The method further includes reading results data from the storage device from the page location and determining whether the results data is correct.

In a further exemplary embodiment, the disclosure is directed to a method of performing data storage. The method includes writing test data to a storage device. The test data has a size at least equal to the block size of the storage device. The method further includes sending a command to the storage device to erase a block of data and includes reading data from the storage device to locate unerased data.

In addition, the disclosure is directed to a method of performing data storage. The method includes selecting an address. The address includes a set of column bits and a set of row bits. The method further includes determining whether the location indicated by the address is accessible and includes changing the address by incrementally shifting a row bit of the set of row bits in response to determining that the location is accessible.

The disclosure is also directed to a controller including a memory device descriptor and a device driver configured to access a memory device to determine a command protocol of the memory device. The device driver is configured to use the command protocol to write data to the memory device to determine a page size, a block size, and an address space associated with the memory device. The device driver is configured to manipulate the memory device descriptor based on the page size, the block size, and the address space and to communicate with the memory device based on the memory device descriptor.

FIG. 1 includes an illustration of an exemplary system 100 that includes a controller 104 and a memory device 106. The memory device 106 is responsive to the controller 104. In addition, the system 100 may include a host device 102 in communication with the controller 104. In one exemplary embodiment, the host device 102 is a remote device that communicates with the controller 104 via a serial interface, such as a universal serial bus (USB) interface. In another exemplary embodiment, the host 102 and controller 104 may form a portion of a system-on-a-chip that may be implemented in a combination of software and hardware.

Upon initialization of an electronic device or upon start up of the electronic device, the controller 104 is configured to access the memory device 106 and determine the device parameters associated with the memory device 106. Such device parameters include, for example, the page size, the number of pages within a block, and the number of blocks on the memory device 106. In addition, the device parameters may indicate which command set or communication protocol to use in communicating with the memory device 106.

Figure 2:
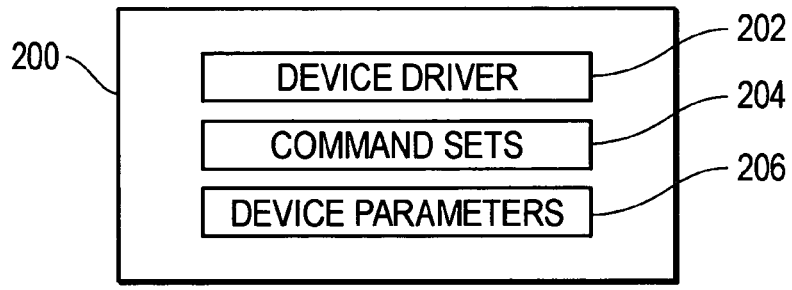

In one exemplary embodiment, illustrated in FIG. 2, a processing system or controller 200 includes a device driver 202, a set of command sets 204, and a register or storage location that stores device parameters 206. The device driver 202 may be implemented in hardware, software, or a combination thereof. In general, the device driver 202 is configured to communicate with a memory device to read, write and erase data.

Upon start up of an electronic device including the processing system or controller 200 or upon initialization of the electronic device including initialization of the processing system or the controller 200, the device driver 202 may determine the device parameters 206 by communicating with a memory device accessible to the device driver 202. For example, the device driver 202 may attempt to communicate with the memory device using a command set from the set of command sets 204. In one exemplary embodiment, the set of command sets 204 are implemented in software as part of the device driver 202. When the command set selected by a device driver results in error free communication with the memory device, the command set may be used to communicate with the memory device to determine the device parameters 206. However, when the selected command set does not function to establish communication with the memory device, the device driver 202 may select a subsequent command set form the set of command sets 204 until a command set is discovered that permits communication with the memory device or the set of command sets is exhausted.

In one exemplary embodiment, the device driver 202 is configured to read, write, and erase data from the memory device to determine the device parameters 206. For example, the device driver may communicate a page of data with the memory device to determine a page size. In another exemplary embodiment, the device driver may erase a memory block of the memory device to determine a block size. In a further exemplary embodiment, the device driver 202 may write pages to incremented addresses to determine a capacity of the memory device.

Figure 3:
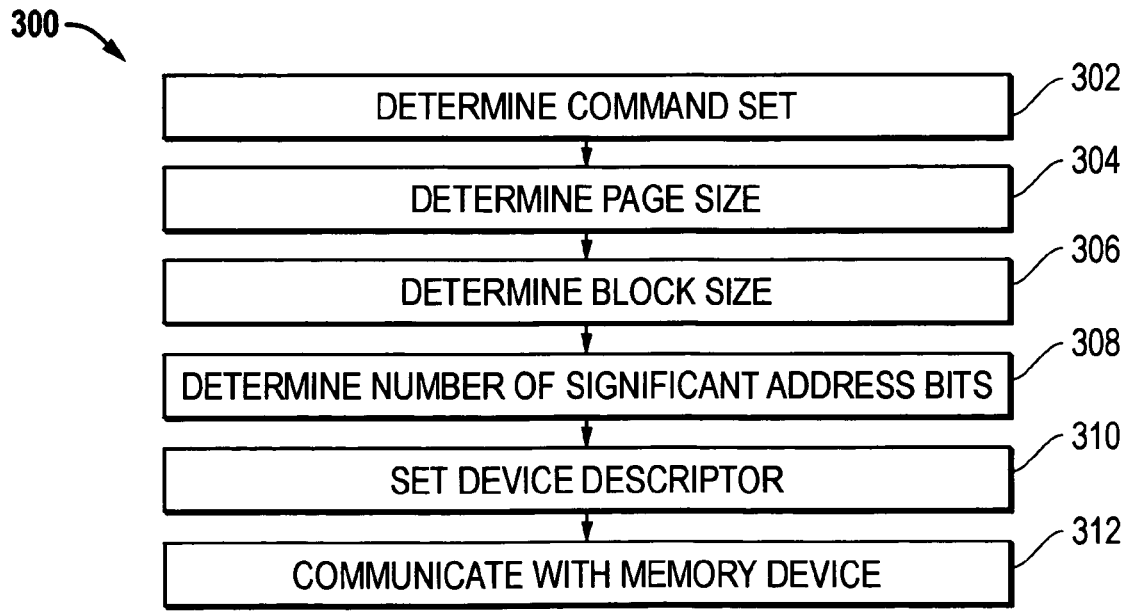
FIGS. 3, 4 and 5 include illustrations of exemplary methods for use by an electronic device, such as the exemplary electronic devices illustrated in FIGS. 1 and 2.

FIG. 3 includes an illustration of an exemplary method 300 for determining the device parameters associated with accessing a particular memory device. The method 300 includes determining a command set or communication protocol, as illustrated at 302. For example, the device driver may select a command set from a set of command sets and attempt to communicate with the memory device using the selected command set. In one embodiment, the device driver attempts to access a manufacturer identification or a device identification. Successful reading of the manufacturer identification or the device identification may indicate that a compatible command set has been selected. In another exemplary embodiment, the device driver may attempt to read or write data using a selected command set or to perform another function associated with accessing the memory device using the selected command set. When a command set is found that successfully communicates with the memory device, parameters may be stored indicating which command set to use when communicating with the memory device. In an alternative embodiment, a manufacturer identification or a device identification may be used in conjunction with a table to determine the appropriate command set or communication protocol for use in communicating with the memory device.

The device driver determines a page size, as illustrated at 304. For example, the device driver may select a page size and write data having a size equal to the selected page size to a specific address or location on the memory device. In one exemplary embodiment, the specific address or location on the memory device is the first page or page 0 of block 0. To determine whether the write process was successful, the device driver may read data from the location to determine whether the data was written accurately. Subsequent page sizes may be selected for read, write and compare operations to determine a highest successful page size for the writing operation.

Once the page size has been determined, the device driver may attempt to determine the block size, as illustrated at 306. For example, the device driver may write data to a specific location on the memory device and direct the memory device to erase a block. The device driver may read data from that location to determine a location of un-erased data and establish a block size using that location. In one exemplary embodiment, the location is the first memory block or block 0.

The device driver may determine the capacity of the memory device based on the number of addressable pages and blocks or number of significant address bits, as illustrated at 308. For example, the device driver may attempt to read data from increasingly higher addresses to determine a highest addressable address or highest significant address bit.

Once the device access parameters have been determined, the device driver may write a device descriptor or indicators of the device parameter to a register, as illustrated at 310. During operation, the device driver may communicate with the memory device using the established command set and device parameters, as illustrated at 312.

Figure 4:
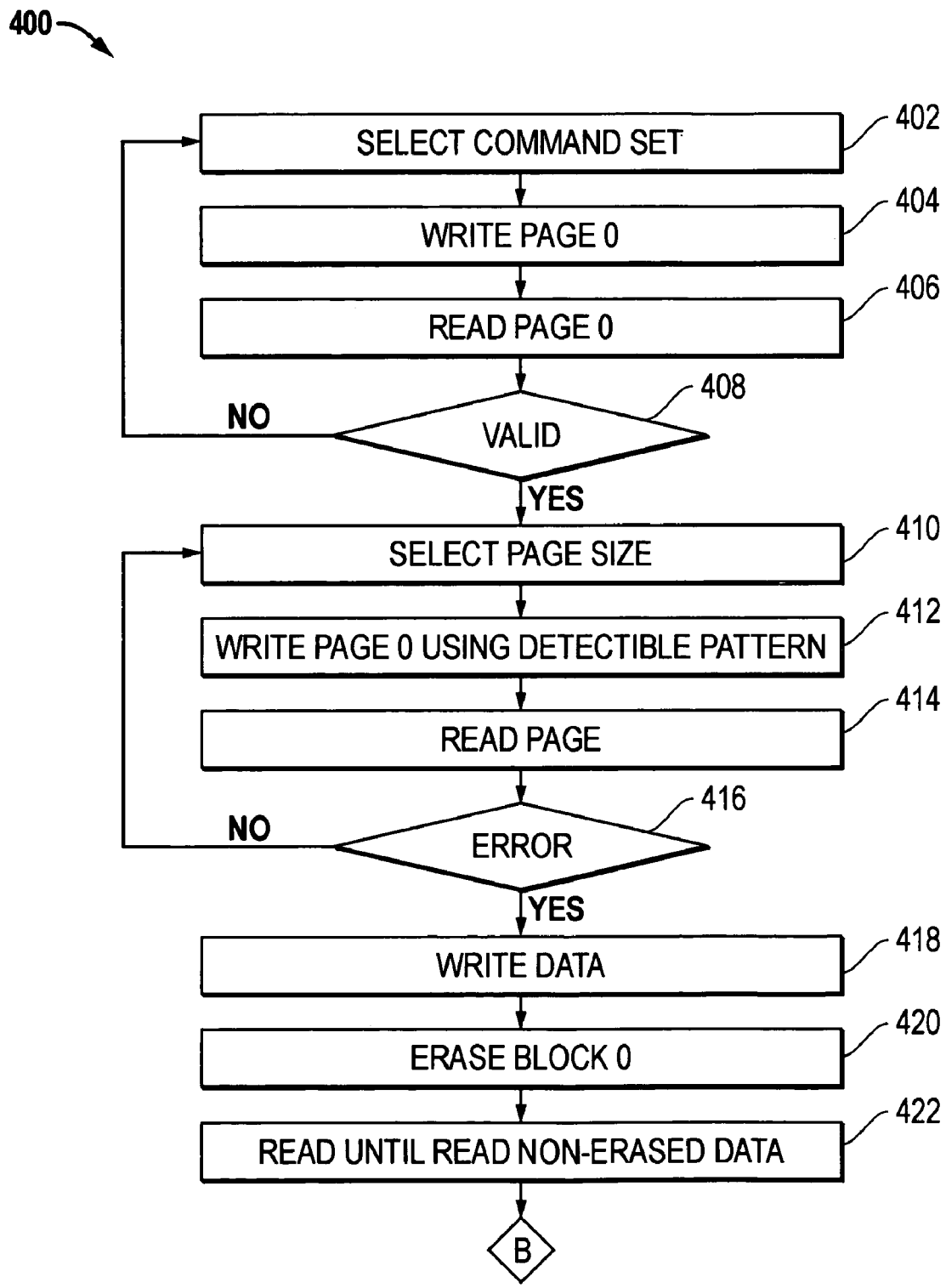
Figures 5, 6:
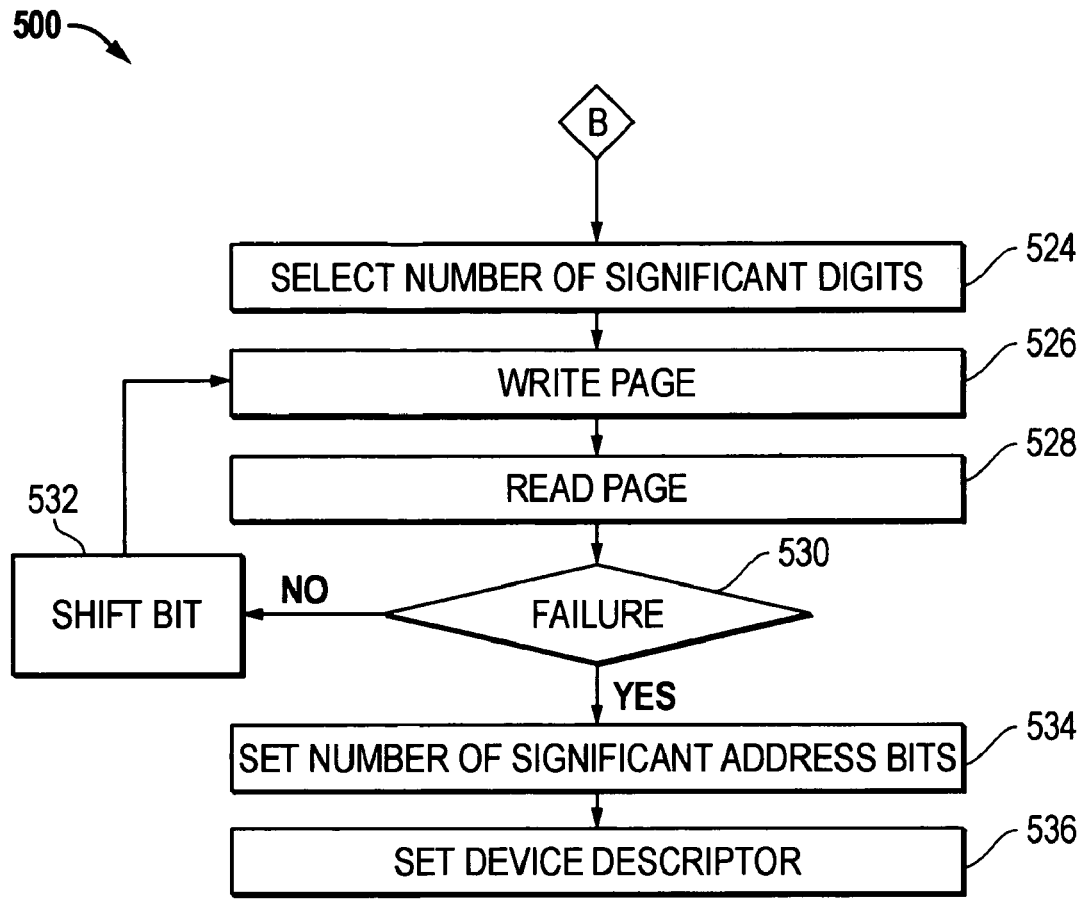
FIG. 6 includes an illustration of exemplary addresses for use by methods, such as the methods illustrated in FIGS. 3, 4 and 5.

FIG. 4 and 5 include illustrations of an exemplary method 400/500 for accessing a memory device. As illustrated in FIG. 4, a command set may be determined by selecting a command set or communication protocol from a set of command sets, as illustrated at 402. In one exemplary embodiment, data is written to page zero, as illustrated at 404, and the data is read from page zero, as illustrated at 406. When the read/write operation is successful, as illustrated at 408, the command set is determined. However, when the read/write operation is unsuccessful, a subsequent command set may be selected from the set of command sets, as illustrated at 402. Alternatively, a command from the selected command set may be sent to the memory device and the success or failure of that command used to determine the command set.

Once the command set is determined, a page size of the memory device may be determined. For example, a page size may be selected, as illustrated at 410. In an exemplary embodiment, the first page size selected may be the smallest page size compatible with the controller or processing system. Data may be written to a page location, such as page 0 of memory block 0, having the specified or selected page size, as illustrated at 412. The data written to the page location has a detectable pattern, such as all 1s, all 0s, or a list of primes. A command is sent to the memory device to read a page, as illustrated at 414, and the data resulting from the read command is compared to the data written to the device. When no errors are detected, as illustrated at 416, an increased page size is selected, as illustrated at 410. However, when an error is detected, as illustrated at 416, the page size is determined to be the previous page size that resulted in an error free write/read operation.

The block size may be determined by writing data to the memory device, as illustrated at 418. The size of the data written to the memory device may be equal to the largest block size compatible with the processing system or controller. The data may be written to a specific location, such as starting with page 0 of memory block 0 and continuing until data having the selected size is written. In one embodiment, an erase command is issued to the electronic device to erase a block at the specified location, such as block zero, as illustrated at 420. Data is read from the memory device starting with the specified location until non-erased data is encountered, as illustrated at 422. The location of the non-erased or un-erased data provides an indication of the block size and, thus, the number of pages within a block. For example, the number of pages within a block is the total block size divided by the page size.

The capacity of the device may be determined, as illustrated by method 500 as illustrated in FIG. 5. For example, a number of significant address bits may be selected, as illustrated at 524. In one exemplary embodiment, a first row bit is set to one and the system determines whether the location indicated by the first row bit is accessible or available, such as by attempting to read/write pages to an address indicated by that row bit. In one exemplary embodiment, a page is written to the address indicated by a one in the highest significant address bit, as illustrated at 526, and the page at that location is read, as illustrated at 528. When a failure does not occur, as illustrated at 530, the highest significant address bit is shifted to a higher significant address bit, as illustrated at 532. FIG. 6 includes an illustration of exemplary address shifting useful in acquiring the highest significant address bit and, thus, in determining the capacity of a memory device. Typically, addresses are organized conceptually into a set of column bits and a set of row bits. Often, the set of column bits indicates a location or address within a page and the row bits address a block and page within the block. The first row bit may be selected, as illustrated at 602. Upon incremental shifting, a higher significant address bit is selected, as illustrated at 604. When read/write operations are successful, an even higher significant address bit is selected, as illustrated at 606, and when a subsequent read/write operation is successful using the address illustrated at 606, a higher significant address bit is selected, as illustrated at 608.

Returning to FIG. 5, when the selected address is successful, a subsequent or higher significant address is selected and the page is written, as illustrated at 526, and read, as illustrated at 528, to determine whether the operation fails, as illustrated at 530. When the read/write operation fails, a number of significant address bits are set to the highest successful significant address bit, as illustrated at 534. The highest successful significant address bit is used to set the device parameters or descriptor, as illustrated at 536. During operation, the electronic device may communicate with the memory device using the set of device parameters or the descriptor.

Particular embodiments of the illustrated system and method permit the determination of device access parameters without use of tables of device parameters that may occupy a significant amount of space on controllers and processing systems that are designed to be compatible with a large number of memory devices commercially available. As a result, particular embodiments of the illustrated system and methods reduce memory usage in controllers and processing systems.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of determining memory parameters of a memory device, the method comprising:
   determining a communication protocol associated with the memory device;
   determining a page size of the memory device by using the communication protocol to communicate a page of data;
   determining a block size of the memory device by using the communication protocol to erase a block of the memory device; and
   determining a capacity of the memory device by using the communication protocol to determine a number of significant address bits.

2. The method of claim 1, further comprising setting a descriptor associated with the memory device based on the page size, the block size, and the number of significant address bits.

3. The method of claim 2, further comprising communicating with the memory device based on the descriptor.

4. The method of claim 1, wherein determining the page size of the memory device includes:
   selecting a particular page size;
   writing test data to the memory device to a page location, the test data having a size equal to the particular page size;
   reading results data from the memory device from the page location; and
   determining whether the results data matches the test data.

5. The method of claim 4, wherein a page location is the first page of the memory device.

6. The method of claim 1, wherein determining the block size of the memory device includes:
   writing test data to a storage device starting at a particular block, the test data having a selected size;
   sending a command to the storage device to erase the particular block; and
   reading data from the storage device starting at the particular block to locate unerased data.

7. The method of claim 1, wherein determining the capacity of the memory device includes:
   selecting an address, the address including a set of column bits and a set of row bits;
   determining whether a location indicated by the address is available; and
   changing the address by incrementally shifting a row bit of the set of row bits in response to determining that the location is available.

8. The method of claim 7, further comprising setting the number of significant address bits in response to determining that the location is unavailable.

9. The method of claim 7, wherein determining whether the location indicated by the address is available includes:
   writing test data to the memory device at the address of the location;
   reading results data from the memory device from the address of the location; and
   comparing the test data to the results data.

10. The method of claim 1, wherein determining the communication protocol includes sending a command to the memory device and determining whether an error occurs.

11. The method of claim 1, further including accessing the memory device to determine a manufacture identification and a device identification.

12. A method of performing data storage, the method comprising:
   selecting a first page size;
   writing test data to a storage device to a page location, the test data having the first page size;
   reading results data from the storage device from the page location; and
   determining whether the results data is correct.

13. The method of claim 12, wherein determining whether the results data is correct includes comparing the results data and the test data.

14. The method of claim 12, wherein the test data is patterned data.

15. The method of claim 14, wherein the patterned data is a list of primes.

16. The method of claim 12, further comprising selecting a second page size when the results data is correct.

17. The method of claim 12, further comprising setting a page size descriptor based on a smallest error free page size when the read data is incorrect.

18. The method of claim 12, wherein the page location is a first page location.

19. A method of performing data storage, the method comprising:
    writing test data to a storage device starting at a particular block, the test data having a selected size;
    sending a command to the storage device to erase the particular block of data;
    reading data from the storage device starting at the particular block of data to determine a location of unerased data; and
    determining a block size of the storage device based on the location of unerased data.

20. The method of claim 19, further comprising setting the block size of a storage device descriptor based on the location of the unerased data.

21. The method of claim 19, wherein writing the test data to the storage device includes writing the test data to consecutive pages of the storage device beginning with a first page of the storage device.

22. The method of claim 19, wherein reading data from the storage device includes reading data from consecutive pages of the storage device beginning with a first page of the storage device.

23. A method of performing data storage, the method comprising:
    selecting an address, the address including a set of column bits and a set of row bits;
    determining whether a location indicated by the address is accessible; and
    changing the address by incrementally shifting a row bit of the set of row bits in response to determining that the location is accessible.

24. The method of claim 23, further comprising setting the number of significant address bits in response to determining that the location indicated by the address is inaccessible.

25. The method of claim 24, wherein setting the number of significant address bits includes setting the number of significant address bits based on the row bit used to determine the highest accessible location.

26. The method of claim 23, wherein determining whether the location is accessible includes:
    writing test data to the memory device at the address;
    reading results data from the memory device from the address; and
    comparing the test data to the results data.

27. A controller comprising:
    a memory device descriptor; and
    a device driver configured to access a memory device to determine a command protocol of the memory device, the device driver configured to use the command protocol to write data to the memory device to determine a page size, a block size, and an address space associated with the memory device, the device driver configured to manipulate the memory device descriptor based on the page size, the block size, and the address space and to communicate with the memory device based on the memory device descriptor.

* * * * *